United States Patent
Todd et al.

(10) Patent No.: US 8,563,480 B2
(45) Date of Patent: *Oct. 22, 2013

(54) SUBTERRANEAN BRIDGING AGENTS

(75) Inventors: Bradley L. Todd, Duncan, OK (US); Trinidad Munoz, Jr., Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 526 days.

This patent is subject to a terminal disclaimer.

(21) Appl. No.: 12/786,814

(22) Filed: May 25, 2010

(65) Prior Publication Data

US 2010/0267591 A1    Oct. 21, 2010

Related U.S. Application Data

(62) Division of application No. 10/664,126, filed on Sep. 17, 2003, now Pat. No. 7,829,507.

(51) Int. Cl.
*C09K 8/12* (2006.01)
*E21B 7/00* (2006.01)

(52) U.S. Cl.
USPC ........... 507/110; 507/117; 507/128; 507/129; 507/131; 507/136; 507/138; 507/139; 507/260; 507/267; 175/66; 175/72

(58) Field of Classification Search
None
See application file for complete search history.

(56) References Cited

U.S. PATENT DOCUMENTS

| | | | |
|---|---|---|---|
| 3,419,580 A * | 12/1968 | Kuryla | 549/415 |
| 5,756,511 A * | 5/1998 | West et al. | 514/263.24 |
| 5,783,527 A | 7/1998 | Dobson, Jr. et al. | |
| 6,143,698 A | 11/2000 | Murphey et al. | |
| 6,258,755 B1 | 7/2001 | House et al. | |
| 6,372,245 B1 * | 4/2002 | Bowman et al. | 424/427 |
| 7,044,224 B2 * | 5/2006 | Nguyen | 166/308.1 |
| 7,080,688 B2 | 7/2006 | Todd et al. | |
| 7,140,438 B2 * | 11/2006 | Frost et al. | 166/278 |
| 7,168,489 B2 * | 1/2007 | Frost et al. | 166/278 |
| 7,497,278 B2 * | 3/2009 | Schriener et al. | 175/64 |
| 7,553,800 B2 | 6/2009 | Munoz, Jr. | |
| 7,648,946 B2 | 1/2010 | Munoz, Jr. | |
| 7,829,507 B2 | 11/2010 | Todd et al. | |
| 2003/0175346 A1 * | 9/2003 | Billotte et al. | 424/468 |
| 2005/0006095 A1 | 1/2005 | Justus et al. | |
| 2010/0230108 A1 | 9/2010 | Todd et al. | |

OTHER PUBLICATIONS

Office Action for U.S. Appl. No. 10/664,126 dated Aug. 3, 2010.
Office Action for U.S. Appl. No. 12/786,767 dated Nov. 15, 2010.
Office Action for U.S. Appl. No. 12/786,767 dated Jun. 25, 2010.
Schlumberger Oilfield Glossary: Term "Bridging Material," http://www.glossary.oilfield.slb.com/Display.cfm?Term=bridging%20material, Date: 2011.
Office Action for U.S. Appl. No. 12/786,767 dated May 10, 2011.

* cited by examiner

*Primary Examiner* — John J Figueroa

(74) *Attorney, Agent, or Firm* — Craig W. Roddy; McDermott Will & Emery LLP

(57) ABSTRACT

The present invention relates to bridging agents for use in subterranean formations, to well drill-in and servicing fluids comprising such bridging agents, and to methods of using such bridging agents and well drill-in and servicing fluids in subterranean drilling operations. An example of a well drill-in and servicing fluid of the present invention comprises a viscosified fluid, a fluid loss control additive, and a bridging agent comprising a degradable material.

21 Claims, 2 Drawing Sheets

SUBTERRANEAN BRIDGING AGENTS

BACKGROUND OF THE INVENTION

1. Field of the Invention

The present invention relates to bridging agents for use in subterranean formations, to well drill-in and servicing fluids comprising such bridging agents, and to methods of using such bridging agents and well drill-in and servicing fluids in subterranean drilling operations.

2. Description of Related Art

Often, once drilling of a well bore in a subterranean formation has been initiated, an operator will employ a fluid referred to as a "well drill-in and servicing fluid." As referred to herein, the term "well drill-in and servicing fluid" will be understood to mean a fluid placed in a subterranean formation from which production has been, is being, or may be cultivated. For example, an operator may begin drilling a subterranean borehole using a drilling fluid, cease drilling at a depth just above that of a productive formation, circulate a sufficient quantity of a well drill-in and servicing fluid through the bore hole to completely flush out the drilling fluid, then proceed to drill into the desired formation using the well drill-in and servicing fluid. Well drill-in and servicing fluids are often utilized, inter alia, to minimize damage to the permeability of such formations.

Well drill-in and servicing fluids may also include "fluid loss control fluids." As referred to herein, the term "fluid loss control fluid" will be understood to mean a fluid designed to form a filter cake onto a screen or gravel pack, or in some cases, directly onto the formation. For example, a fluid loss control fluid may comprise a comparatively small volume of fluid designed to form a filter cake so as to plug off a "thief zone" (a formation, most commonly encountered during drilling operations, into which the drilling fluid may be lost). Generally, well drill-in and servicing fluids are designed to form a fast and efficient filter cake on the walls of the well bores within the producing formations to minimize leak-off and damage. The filter cake is removed before hydrocarbons from the formation are produced. Conventionally, removal has been by contacting the filter cake with one or more subsequent fluids.

Other conventional methods of removing the filter cake include formulating the well drill-in and servicing fluid so as to include an acid-soluble particulate solid bridging agent. The resultant filter cake formed by such well drill-in and servicing fluid is then contacted with a strong acid to ultimately dissolve the bridging agent. This method is problematic, however, because the strong acid often corrodes metallic surfaces and completion equipment such as sand control screens, thereby causing such equipment to prematurely fail. Further, the acid may damage the producing formation. Additionally, the acid may cause the bridging agent to dissolve too quickly, resulting in the acid being lost into the formation, rather than completely covering the filter cake.

Another method has been to use a water-soluble particulate solid bridging agent in the well drill-in and servicing fluid, which is later contacted with an aqueous salt solution that is undersaturated with respect to such bridging agents. This method is problematic, however, because such bridging agents may require a relatively long period of time to dissolve in the solutions, due to, inter alia, the presence of various gelling agents in the well drill-in and servicing fluids. Such gelling agents shield the water-soluble bridging agents. A further problem is that the aqueous salt solution has a limited range of possible densities.

SUMMARY OF THE INVENTION

The present invention relates to bridging agents for use in subterranean formations, to well drill-in and servicing fluids comprising such bridging agents, and to methods of using such bridging agents and well drill-in and servicing fluids in subterranean drilling operations.

An example of a method of the present invention comprises the steps of: placing a well drill-in and servicing fluid in a subterranean formation, the well drill-in and servicing fluid comprising a viscosifier, a fluid loss control additive, and a bridging agent comprising a degradable material; and forming a self-degrading filter cake comprising the bridging agent upon a surface within the formation whereby fluid loss to the formation through the self-degrading filter cake is reduced.

Another example of a method of the present invention comprises a method of degrading a filter cake in a subterranean formation, the filter cake having been deposited therein by a well drill-in and servicing fluid comprising a bridging agent, comprising the step of utilizing a bridging agent comprising a degradable material.

Another example of a method of the present invention comprises a method of drilling an open hole in a subterranean formation, comprising the steps of: circulating through a drill pipe and drill bit a well drill-in and servicing fluid comprising a viscosified fluid, a fluid loss control additive, and a bridging agent comprising a degradable material; forming a filter cake comprising the bridging agent upon a surface within the formation; and permitting the filter cake to degrade.

An example of a composition of the present invention is a well drill-in and servicing fluid comprising a viscosified fluid; a fluid loss control additive; and a bridging agent comprising a degradable material.

The features and advantages of the present invention will be readily apparent to those skilled in the art upon a reading of the description of the preferred embodiments, which follows.

DESCRIPTION OF PREFERRED EMBODIMENTS

Figure 1:
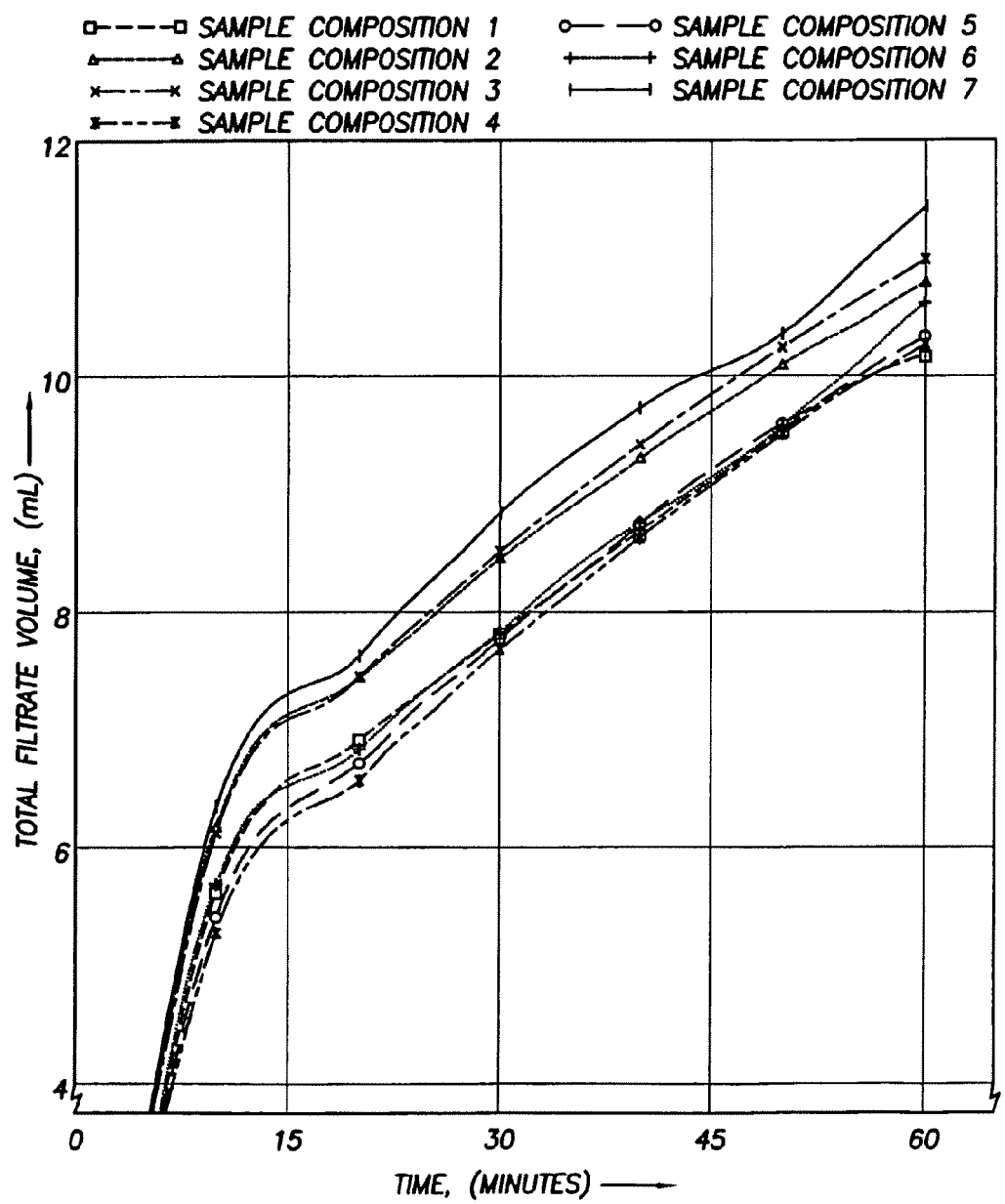
FIG. 1 depicts a graphical representation of the results of a dynamic filtration test performed on seven exemplary embodiments of filter cakes formed from well drill-in and servicing fluids of the present invention.

The present invention relates to bridging agents for use in subterranean formations, to well drill-in and servicing fluids comprising such bridging agents, and to methods of using such bridging agents and well drill-in and servicing fluids in subterranean drilling operations.

The well drill-in and servicing fluids of the present invention generally comprise a viscosified fluid comprising a viscosifier, a fluid loss control additive, and a bridging agent comprising a degradable material capable of undergoing an irreversible degradation downhole. The term "irreversible" as used herein means that the degradable material once degraded should not recrystallize or reconsolidate while downhole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation.

A variety of viscosified fluids may be included in the well drill-in and servicing fluids of the present invention. These are fluids whose viscosities have been enhanced by the use of a viscosifier. In certain embodiments, the viscosified fluid may comprise a base fluid such as water, oil, or mixtures thereof. The viscosified fluid is present in the well drill-in and servicing fluids of the present invention in an amount in the range of from about 68% to about 99% by weight. In certain preferred embodiments, the viscosified fluid is present in the well drill-in and servicing fluids of the present invention in an amount in the range of from about 90% to about 97% by weight.

The viscosified fluids comprise a viscosifier. A variety of viscosifiers may be included in the well drill-in and servicing fluids of the present invention. Examples of suitable viscosifiers include, inter alia, biopolymers such as xanthan and succinoglycan, cellulose derivatives such as hydroxyethylcellulose and guar and its derivatives such as hydroxypropyl guar. In certain preferred embodiments, the viscosifier is xanthan. The viscosifier is present in the well drill-in and servicing fluids of the present invention in an amount sufficient to suspend the bridging agent and drill cuttings in the well drill-in and servicing fluid. More particularly, the viscosifier is present in the well drill-in and servicing fluids of the present invention in an amount in the range of from about 0.01% to about 0.6% by weight. In certain preferred embodiments, the viscosifier is present in the well drill-in and servicing fluid in an amount in the range of from about 0.13% to about 0.30% by weight.

The well drill-in and servicing fluids of the present invention further comprise a fluid loss control additive. A variety of fluid loss control additives can be included in the well drill-in and servicing fluids of the present invention, including, inter alia, starch, starch ether derivatives, hydroxyethylcellulose, cross-linked hydroxyethylcellulose, and mixtures thereof. In certain preferred embodiments, the fluid loss control additive is starch. The fluid loss control additive is present in the well drill-in and servicing fluids of the present invention in an amount sufficient to provide a desired degree of fluid loss control. More particularly, the fluid loss control additive is present in the well drill-in and servicing fluid in an amount in the range of from about 0.01% to about 3% by weight. In certain preferred embodiments, the fluid loss control additive is present in the well drill-in and servicing fluid in an amount in the range of from about 1% to about 2% by weight.

The well drill-in and servicing fluids of the present invention further comprise a bridging agent comprising a degradable material. The bridging agent becomes suspended in the well drill-in and servicing fluid and, as the well drill-in and servicing fluid begins to form a filter cake within the subterranean formation, the bridging agent becomes distributed throughout the resulting filter cake, most preferably uniformly. In certain preferred embodiments, the filter cake forms upon the face of the formation itself, upon a sand screen, or upon a gravel pack. After the requisite time period dictated by the characteristics of the particular degradable material utilized, the degradable material undergoes an irreversible degradation. This degradation, in effect, causes the degradable material to substantially be removed from the filter cake. As a result, voids are created in the filter cake. Removal of the degradable material from the filter cake allows produced fluids to flow more freely.

Generally, the bridging agent comprising the degradable material is present in the well drill-in and servicing fluid in an amount sufficient to create an efficient filter cake. As referred to herein, the term "efficient filter cake" will be understood to mean a filter cake comprising no material beyond that required to provide a desired level of fluid loss control. In certain embodiments, the bridging agent comprising the degradable material is present in the well drill-in and servicing fluid in an amount ranging from about 0.1% to about 32% by weight. In certain preferred embodiments, the bridging agent comprising the degradable material is present in the well drill-in and servicing fluid in the range of from about 3% and about 10% by weight. In certain preferred embodiments, the bridging agent is present in the well drill-in and servicing fluids in an amount sufficient to provide a fluid loss of less than about 15 mL in tests conducted according to the procedures set forth by API Recommended Practice (RP) 13. One of ordinary skill in the art with the benefit of this disclosure will recognize an optimum concentration of degradable material that provides desirable values in terms of enhanced ease of removal of the filter cake at the desired time without undermining the stability of the filter cake during its period of intended use.

Nonlimiting examples of suitable degradable materials that may be used in conjunction with the present invention include but are not limited to degradable polymers, dehydrated compounds, and/or mixtures of the two. In choosing the appropriate degradable material, one should consider the degradation products that will result. Also, these degradation products should not adversely affect other operations or components. For example, a boric acid derivative may not be included as a degradable material in the well drill-in and servicing fluids of the present invention where such fluids utilize xanthan as the viscosifier, because boric acid and xanthan are generally incompatible. One of ordinary skill in the art, with the benefit of this disclosure, will be able to recognize when potential components of the well drill-in and servicing fluids of the present invention would be incompatible or would produce degradation products that would adversely affect other operations or components.

As for degradable polymers, a polymer is considered to be "degradable" herein if the degradation is due to, inter alia, chemical and/or radical process such as hydrolysis, oxidation, enzymatic degradation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how the polymer degrades, e.g., temperature, presence of moisture, oxygen, microorganisms, enzymes, pH, and the like.

Suitable examples of degradable polymers that may be used in accordance with the present invention include but are not limited to those described in the publication of Advances in Polymer Science, Vol. 157 entitled "Degradable Aliphatic Polyesters" edited by A. C. Albertsson. Specific examples include homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. Specific examples of suitable polymers include polysaccharides such as dextran or cellulose; chitin; chitosan; proteins; orthoesters; aliphatic polyesters; poly(lactide); poly(glycolide); poly(c-caprolactone); poly(hydroxybutyrate); poly(anhydrides); aliphatic polycarbonates; poly(orthoesters); poly(amino acids); poly(ethylene oxide); and polyanhydrides. Of these suitable polymers, aliphatic polyesters and polyanhydrides are preferred.

Aliphatic polyesters degrade chemically, inter alia, by hydrolytic cleavage. Hydrolysis can be catalyzed by either acids or bases. Generally, during the hydrolysis, carboxylic end groups are formed during chain scission, and this may enhance the rate of further hydrolysis. This mechanism is known in the art as "autocatalysis," and is thought to make polymer matrices more bulk eroding.

Suitable aliphatic polyesters have the general formula of repeating units shown below:

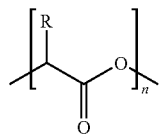

formula I where n is an integer between 75 and 10,000 and R is selected from the group consisting of hydrogen, alkyl, aryl, alkylaryl, acetyl, heteroatoms, and mixtures thereof. Of the suitable aliphatic polyesters, poly(lactide) is preferred. Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to writ of formula I without any limitation as to how the polymer was made such as from lactides, lactic acid, or oligomers, and without reference to the degree of polymerization or level of plasticization.

The lactide monomer exists generally in three different forms: two stereoisomers L- and D-lactide and racemic D,L-lactide (meso-lactide). The oligomers of lactic acid, and oligomers of lactide are defined by the formula:

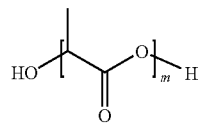

formula II where m is an integer: $2 \leq m \leq 75$. Preferably m is an integer: $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable material is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined in accordance with the present invention. Additionally, they may be copolymerized with, for example, glycolide or other monomers like c-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other polyesters.

Plasticizers may be present in the polymeric degradable materials of the present invention. The plasticizers may be present in an amount sufficient to provide the desired characteristics, for example, (a) more effective compatibilization of the melt blend components, (b) improved processing characteristics during the blending and processing steps, and (c) control and regulation of the sensitivity and degradation of the polymer by moisture. Suitable plasticizers include but are not limited to derivatives of oligomeric lactic acid, selected from the group defined by the formula:

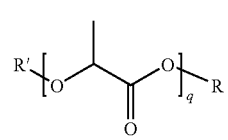

formula III where R is a hydrogen, alkyl, aryl, alkylaryl, acetyl, heteroatom, or a mixture thereof and R is saturated, where R' is a hydrogen, alkyl, aryl, alkylaryl, acetyl, heteroatom, or a mixture thereof and R' is saturated, where R and R' cannot both be hydrogen, where q is an integer: $2 \leq q \leq 75$; and mixtures thereof. Preferably q is an integer; $2 \leq q \leq 10$. As used herein the term "derivatives of oligomeric lactic acid" includes derivatives of oligomeric lactide.

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosures of which are incorporated herein by reference. In addition to the other qualities above, the plasticizers may enhance the degradation rate of the degradable polymeric materials.

Polyanhydrides are another type of particularly suitable degradable polymer useful in the present invention. Polyanhydride hydrolysis proceeds, inter alia, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include but are not limited to poly(maleic anhydride) and poly(benzoic anhydride).

The physical properties of degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the material utilized can be further tailored by blending, and copolymerizing it with another polymer, or by changing the macromolecular architecture (e.g., hyper-branched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains. For example, poly(phenyllactide) will degrade at about ⅕th of the rate of racemic poly(lactide) at a pH of 7.4 at 55° C. One of ordinary skill in the art with the benefit of this disclosure will be able to determine the appropriate functional groups to introduce to the polymer chains to achieve the desired physical properties of the degradable polymers.

Dehydrated compounds may be used in accordance with the present invention as a degradable material. A dehydrated compound is suitable for use in the present invention if it will degrade over time as it is rehydrated. For example, a particulate solid anhydrous borate material that degrades over time may be suitable. Specific examples of particulate solid anhydrous borate materials that may be used include but are not limited to anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed.

Blends of certain degradable materials may also be suitable. One example of a suitable blend of materials is a mixture of poly(lactic acid) and sodium borate where the mixing of an acid and base could result in a neutral solution where this is desirable. Another example would include a blend of poly (lactic acid) and boric oxide, a blend of calcium carbonate and poly(lactic) acid, a blend of magnesium oxide and poly(lactic) acid, and the like. In certain preferred embodiments, the degradable material is calcium carbonate plus poly(lactic) acid. Where a mixture including poly(lactic) acid is used, in certain preferred embodiments the poly(lactic) acid is present in the mixture in a stoichiometric amount, e.g., where a mixture of calcium carbonate and poly(lactic) acid is used, the mixture comprises two poly(lactic) acid units for each calcium carbonate unit. Other blends that undergo an irreversible degradation may also be suitable, if the products of the degradation do not undesirably interfere with either the conductivity of the filter cake or with the production of any of the fluids from the subterranean formation.

The choice of degradable material can depend, at least in part, on the conditions of the well, e.g., well bore temperature. For instance, lactides have been found to be suitable for lower temperature wells, including those within the range of about 60° F. to about 150° F., and polylactides have been found to be suitable for well bore temperatures above this range. Dehydrated salts may also be suitable for higher temperature wells.

Also, we have found that a preferable result is achieved if the degradable material degrades slowly over time as opposed to instantaneously. The slow degradation of the degradable material helps, inter alia, to maintain the stability of the filter cake.

The specific features of the degradable material may be modified so as to maintain the filter cake's filtering capability when the filter cake is intact while easing the removal of the filter cake when such removal becomes desirable. In certain embodiments, the degradable material has a particle size distribution in the range of from about 0.1 micron to about 1.0 millimeters. Whichever degradable material is utilized, the bridging agents may have any shape, including but not limited to particles having the physical shape of platelets, shavings, flakes, ribbons, rods, strips, spheroids, toroids, pellets, tablets, or any other physical shape. One of ordinary skill in the art with the benefit of this disclosure will recognize the specific degradable material and the preferred size and shape for a given application.

The filter cake formed by the well drill-in and servicing fluids of the present invention is removed after a desired amount of time by being contacted with a degrading agent. In certain embodiments, the degrading agent comprises water. The source of the degrading agent may be, inter alia, a well drill-in and servicing fluid, such as a gravel pack fluid or a completion brine, for instance. In certain embodiments, the source of the degrading agent may be the bridging agent itself. For example, the bridging agent may comprise a water-containing compound. Any compound containing releasable water may be used as the water-containing compound. As referred to herein, the term "releasable water" will be understood to mean water that may be released under desired downhole conditions, including, inter alia, temperature. In certain embodiments, the water-containing compound may be sodium acetate trihydrate, sodium borate decahydrate, sodium carbonate decahydrate, or the like. In certain preferred embodiments, the water-containing compound is sodium acetate trihydrate.

The filter cake formed by the well drill-in and servicing fluids of the present invention is a "self-degrading" filter cake. As referred to herein, the term "self-degrading filter cake" will be understood to mean a filter cake that may be removed without the need to circulate a separate "clean up" solution or "breaker" through the well bore, such clean up solution or breaker having no purpose other than to degrade the filter cake. Though the filter cakes formed by the well drill-in and servicing fluids of the present invention constitute "self-degrading" filter cakes, an operator may nevertheless occasionally elect to circulate a separate clean up solution through the well bore under certain circumstances, such as when the operator desires to hasten the rate of degradation of the filter cake. In certain embodiments, the bridging agents of the present invention are sufficiently acid-degradable as to be removed by such treatment.

An example of a method of the present invention comprises the steps of: placing a well drill-in and servicing fluid in a subterranean formation, the well drill-in and servicing fluid comprising a viscosifier, a fluid loss control additive, and a bridging agent comprising a degradable material; and forming a self-degrading filter cake comprising the bridging agent upon a surface within the formation whereby fluid loss to the formation through the self-degrading filter cake is reduced. Another example of a method of the present invention comprises a method of degrading a filter cake in a subterranean formation, the filter cake having been deposited therein by a well drill-in and servicing fluid comprising a bridging agent, comprising the step of utilizing a bridging agent comprising a degradable material.

Another example of a method of the present invention comprises a method of drilling an open hole in a subterranean formation, comprising the steps of: circulating through a drill pipe and drill bit a well drill-in and servicing fluid comprising a viscosified fluid, a fluid loss control additive, and a bridging agent comprising a degradable material; forming a filter cake comprising the bridging agent upon a surface within the formation; and permitting the filter cake to degrade.

An example of a well drill-in and servicing fluid of the present invention comprises a viscosified fluid, a fluid loss control additive, and a bridging agent comprising a degradable material.

To facilitate a better understanding of the present invention, the following examples of exemplary embodiments are given. In no way should such examples be read to limit the scope of the invention.

EXAMPLE 1

A dynamic filtration test was conducted, in a Fann Model 90B dynamic filtration tester, in which seven embodiments of filter cakes of the present invention were constructed. For each of the seven embodiments, a sample composition was formulated comprising 336 mL of a 10% aqueous solution of sodium chloride by weight, to which 0.85 grams of clarified liquid xanthan biopolymer, 7.4 grams of a non-ionic starch derivative, 20 grams of powdered polylactic acid, and 30 grams of calcium carbonate were added. This sample composition was then hot rolled for 16 hours at 150° F.

The dynamic filtration test comprised constructing filter cakes on the inner diameter of a synthetic core comprising "ALOXITE™" having a 35 micron pore throat size. The filter cakes were constructed by continuously shearing each sample composition inside the core for an hour while applying a differential pressure of 500 psid, during which time the filter cake formed on the core's inner diameter. The porous nature of the core provides the potential for fluid to leak outward in a radial direction, with the filtrate rate and volume being dependent on the integrity of the filter cake deposited on the core. The volume of filtrate for a particular sample composition was collected and recorded with time. The test concluded after 60 minutes. The results are depicted in Table 1 below, and in FIG. 1.

TABLE 1

| | Total Filtrate Volume (mL) | | | | | | |
|---|---|---|---|---|---|---|---|
| Time (minutes) | Sample Composition 1 | Sample Composition 2 | Sample Composition 3 | Sample Composition 4 | Sample Composition 5 | Sample Composition 6 | Sample Composition 7 |
| 0 | 0 | 0 | 0 | 0 | 0 | 0 | 0 |
| 10 | 5.64 | 6.20 | 6.14 | 5.33 | 5.42 | 5.68 | 6.33 |
| 20 | 6.92 | 7.45 | 7.45 | 6.62 | 6.74 | 6.86 | 7.66 |
| 30 | 7.84 | 8.48 | 8.53 | 7.72 | 7.79 | 7.88 | 8.83 |
| 40 | 8.70 | 9.32 | 9.44 | 8.65 | 8.76 | 8.76 | 9.76 |
| 50 | 9.56 | 10.11 | 10.24 | 9.55 | 9.62 | 9.58 | 10.63 |
| 60 | 10.26 | 10.8 | 11.03 | 10.34 | 10.35 | 10.36 | 11.44 |

The above example demonstrates, inter alfa, that the well drill-in and servicing fluids of the present invention may be used to provide filter cakes having acceptable filtration leak off, as well as that the integrity of such filter cakes is generally repeatable over a series of tests.

EXAMPLE 2

Figure 2:
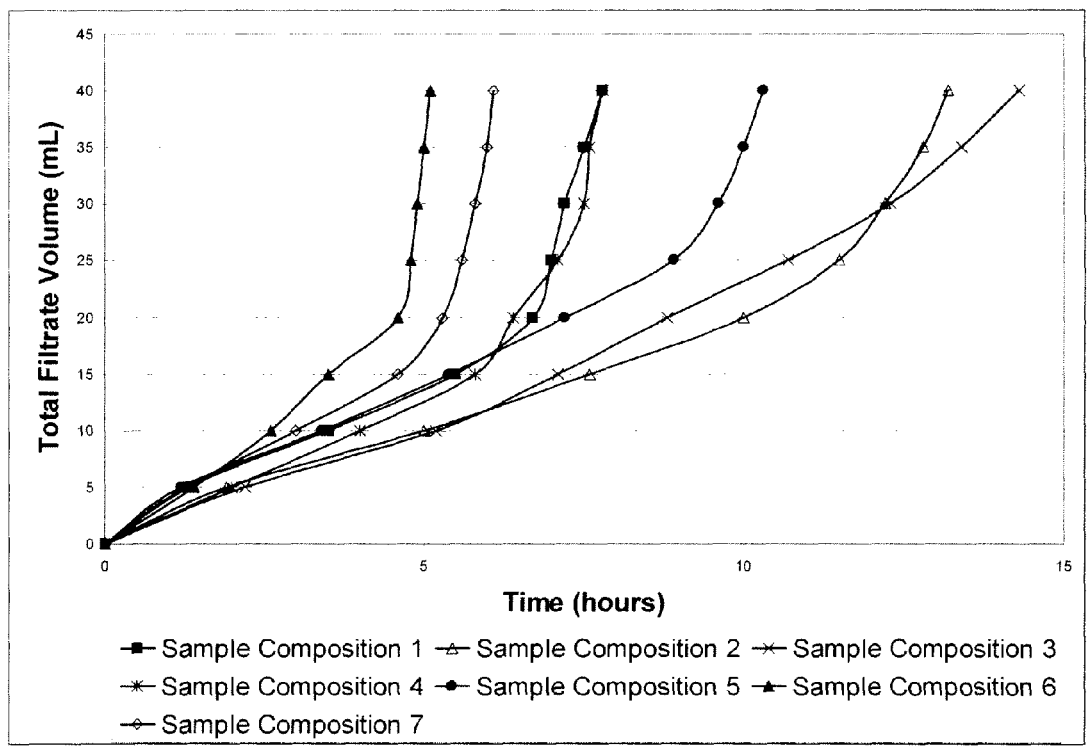
FIG. 2 depicts a graphical representation of the results of a break test performed on seven exemplary embodiments of filter cakes formed from well drill-in and servicing fluids of the present invention.

The seven sample filter cakes prepared in Example 1 were then each subjected to a break test, in which a 10% aqueous solution of sodium chloride by weight was injected into the core at 50 psi differential pressure. Break tests for Sample Compositions 1, 2, 4, and 6 were conducted at 200° F., while break tests for Sample Compositions 3, 5 and 7 were performed at 180° F. As the sodium chloride solution began to break down each filter cake, the amount of filtrate (e.g., the amount of broken filter cake) was collected and measured. The break test continued until such time as the maximum filtrate volume (50 mL) of a particular sample was collected in the Model 90B dynamic filtration tester. The results are illustrated in Table 2 below and in FIG. 2.

TABLE 2

| Total Filtrate | | | | Time (hrs) | | | |
|---|---|---|---|---|---|---|---|
| Volume (mL) | Sample Composition 1 | Sample Composition 2 | Sample Composition 3 | Sample Composition 4 | Sample Composition 5 | Sample Composition 6 | Sample Composition 7 |
| 0 | 0 | 0 | 0 | 0 | 0 | 0 | 0 |
| 5 | 1.71 | 2.25 | 2.25 | 2.07 | 1.45 | 1.51 | 1.59 |
| 10 | 3.59 | 5.06 | 5.28 | 4.11 | 3.49 | 2.66 | 3.07 |
| 15 | 5.39 | 7.64 | 7.13 | 5.82 | 5.43 | 3.53 | 4.52 |
| 20 | 6.73 | 9.97 | 8.90 | 6.41 | 7.36 | 4.65 | 5.29 |
| 25 | 7.06 | 11.48 | 10.7 | 7.1 | 9.0 | 4.84 | 5.63 |
| 30 | 7.30 | 12.30 | 12.27 | 7.57 | 9.61 | 4.9 | 5.87 |
| 35 | 7.65 | 12.84 | 13.47 | 7.75 | 10.03 | 4.97 | 6.08 |
| 40 | 7.93 | 13.31 | 14.38 | 7.89 | 10.36 | 5.03 | 6.13 |

The above example illustrates, inter alfa, that exemplary embodiments of filter cakes formed from the well drill-in and treatment fluids of the present invention are degradable.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

We claim:

1. A filter cake formed within a subterranean formation comprising:
   a bridging agent material that itself comprises a degradable material selected from the group consisting of orthoesters, poly(orthoesters), and combinations thereof.

2. The filter cake of claim 1 wherein the bridging agent further comprises a degradable polymer selected from the group consisting of polysaccharides, chitins, chitosans, proteins, aliphatic polyesters, poly(glycolides), poly(lactides), poly($\epsilon$-caprolactones), poly(hydroxybutyrates), polyanhydrides, aliphatic polycarbonates, poly(amino acids), poly(ethylene oxides), and polyphosphazenes.

3. The filter cake of claim 1 wherein the degradable material further comprises a plasticizer.

4. The filter cake of claim 1 wherein the degradable material has a particle size distribution in the range of from about 0.1 micron to about 1.0 millimeter.

5. The filter cake of claim 1 wherein the bridging agent further comprises a degrading agent.

6. The filter cake of claim 5 wherein the degrading agent comprises a source of releasable water.

7. The filter cake of claim 6 wherein the degrading agent comprises sodium acetate trihydrate, sodium borate decahydrate, sodium carbonate decahydrate, or a mixture thereof.

8. The filter cake of claim 5 wherein the degrading agent is present in a stoichiometric amount.

9. A filter cake formed within a subterranean formation comprising:
   a bridging agent material that itself comprises a degradable material selected from the group consisting of orthoesters, poly(orthoesters), and combinations thereof,
   wherein the degradable material has a particle size distribution in the range from about 0.1 micron to about 1.0 millimeter.

10. The filter cake of claim 9 wherein the bridging agent further comprises a degradable polymer selected from the group consisting of polysaccharides, chitins, chitosans, proteins, aliphatic polyesters, poly(glycolides), poly(lactides), poly($\epsilon$-caprolactones), poly(hydroxybutyrates), polyanhydrides, aliphatic polycarbonates, poly(amino acids), poly(ethylene oxides), and polyphosphazenes.

11. The filter cake of claim 9 wherein the degradable material further comprises a plasticizer.

12. The filter cake of claim 9 wherein the bridging agent further comprises a degrading agent.

13. The filter cake of claim 12 wherein the degrading agent comprises a source of releasable water.

14. The filter cake of claim 13 wherein the degrading agent comprises sodium acetate trihydrate, sodium borate decahydrate, sodium carbonate decahydrate, or a mixture thereof.

15. The filter cake of claim 12 wherein the degrading agent is present in a stoichiometric amount.

16. A filter cake formed within a subterranean formation comprising:
   a bridging agent material that itself comprises a degradable material selected from the group consisting of orthoesters, poly(orthoesters), and combinations thereof; and
   a fluid loss control agent selected from the group consisting of starch, starch ether derivatives, hydroxyethylcellulose, cross-linked hydroxyethylcellulose, and mixtures thereof.

17. The filter cake of claim 16 wherein the bridging agent further comprises a degradable polymer selected from the group consisting of polysaccharides, chitins, chitosans, proteins, aliphatic polyesters, poly(glycolides), poly(lactides), poly($\epsilon$-caprolactones), poly(hydroxybutyrates), polyanhydrides, aliphatic polycarbonates, poly(amino acids), poly(ethylene oxides), and polyphosphazenes.

18. The filter cake of claim 16 wherein the degradable material further comprises a plasticizer.

19. The filter cake of claim 16 wherein the bridging agent further comprises a degrading agent.

20. The filter cake of claim 19 wherein the degrading agent comprises a source of releasable water.

21. The filter cake of claim 16 wherein the degradable material has a particle size distribution in the range of from about 0.1 micron to about 1.0 millimeter.

* * * * *